United States Patent
Hamada et al.

(10) Patent No.: US 11,953,608 B2
(45) Date of Patent: Apr. 9, 2024

(54) POSITION ESTIMATION DEVICE AND POSITION ESTIMATION METHOD

(71) Applicant: Mitsubishi Electric Corporation, Tokyo (JP)

(72) Inventors: Yuji Hamada, Tokyo (JP); Naoki Isozaki, Tokyo (JP); Takuya Matsuda, Tokyo (JP); Takuma Okamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 261 days.

(21) Appl. No.: 17/604,755

(22) PCT Filed: Jul. 8, 2019

(86) PCT No.: PCT/JP2019/027007
§ 371 (c)(1),
(2) Date: Oct. 19, 2021

(87) PCT Pub. No.: WO2021/005687
PCT Pub. Date: Jan. 14, 2021

(65) Prior Publication Data
US 2022/0179104 A1 Jun. 9, 2022

(51) Int. Cl.
*G01S 19/48* (2010.01)
*G01S 19/07* (2010.01)
(Continued)

(52) U.S. Cl.
CPC .............. *G01S 19/48* (2013.01); *G01S 19/07* (2013.01); *G01S 19/49* (2013.01); *G01S 19/396* (2019.08); *G01S 19/51* (2013.01); *G08G 1/09* (2013.01)

(58) Field of Classification Search
CPC ........ G01S 19/48; G01S 19/49; G01S 19/396; G01S 19/07; G01S 19/50; G01S 19/51;
(Continued)

(56) References Cited

U.S. PATENT DOCUMENTS 5,999,880 A * 12/1999 Okada ................... G01S 5/0072
701/469
6,289,279 B1 9/2001 Ito et al.
(Continued)

FOREIGN PATENT DOCUMENTS

JP 2000-155163 A 6/2000
JP 2006-275695 A 10/2006
(Continued)

OTHER PUBLICATIONS

International Search Report and Written Opinion dated Sep. 17, 2019, received for PCT Application PCT/JP2019/027007, Filed on Jul. 8, 2019, 8 pages including English Translation.

*Primary Examiner* — Chuong P Nguyen
(74) *Attorney, Agent, or Firm* — XSENSUS LLP

(57) ABSTRACT

An object of the present invention is to continuously estimate the position with high accuracy while the moving body is traveling. A position estimation device is installed in a moving body, and includes a position estimation unit configured to estimate a position of a subject moving body being the moving body in which the position estimation device is installed using any of positioning means of satellite positioning using a positioning satellite or radio wave positioning using wireless communication, and a positioning means selection unit configured to switch the positioning means the position estimation unit uses for estimation of the position of the subject moving body based on a traveling environment or a peripheral environment of the subject moving body.

8 Claims, 14 Drawing Sheets

(51) Int. Cl.
*G01S 19/49* (2010.01)
*G01S 19/39* (2010.01)
*G01S 19/51* (2010.01)
*G08G 1/09* (2006.01)

(58) Field of Classification Search
CPC ...... G01S 19/40; G01S 5/0284; G01S 13/765; G01C 21/28; G01C 21/30; G08G 1/09
USPC ............ 342/357.32, 357.31, 357.33, 357.34, 342/357.44, 357.23
See application file for complete search history.

(56) References Cited

U.S. PATENT DOCUMENTS

| | | | | |
|---|---|---|---|---|
| 7,812,762 | B2 * | 10/2010 | Shamoto | G01S 19/43 |
| | | | | 342/357.26 |
| 11,049,396 | B2 * | 6/2021 | Hamada | G08G 1/163 |
| 2011/0301779 | A1 * | 12/2011 | Shida | G01S 19/46 |
| | | | | 701/1 |
| 2019/0265039 | A1 * | 8/2019 | Tani | G01C 21/12 |
| 2022/0180645 | A1 * | 6/2022 | Adachi | G08G 1/096775 |
| 2022/0276395 | A1 * | 9/2022 | Yoshida | G01S 19/396 |
| 2023/0243657 | A1 * | 8/2023 | Kiyohara | G01C 21/30 |
| | | | | 701/446 |

FOREIGN PATENT DOCUMENTS

| | | | | |
|---|---|---|---|---|
| JP | 2007-3287 A | | 1/2007 | |
| JP | 2007-178270 A | | 7/2007 | |
| JP | 2014-66635 A | | 4/2014 | |
| JP | 2018-91714 A | | 6/2018 | |
| KR | 20220146444 A | * | 11/2022 | ............. G01S 19/48 |
| WO | WO-2016038881 A1 | * | 3/2016 | ............. G01S 5/14 |
| WO | WO-2019111549 A1 | * | 6/2019 | ............ B60W 10/20 |

* cited by examiner

FIG. 3

| TRAVELING ENVIRONMENT/PERIPHERAL ENVIRONMENT | EXAMPLE OF ENVIRONMENT | POSITIONING MEANS TO BE USED |
|---|---|---|
| PLACE WHERE POSITION ACCURACY OF SATELLITE POSITIONING IS FINE | OPEN SKY | SATELLITE POSITIONING |
| POINT WHERE ACCURACY OF SATELLITE POSITIONING IS DETERIORATED DUE TO PRE-READING OF MAP | | RADIO WAVE POSITIONING |
| PLACE WHERE NO SATELLITES CAN BE SEEN | UNDERGROUND/TUNNELS/ GRADE SEPARATION | RADIO WAVE POSITIONING |
| ROAD WITH MUCH MULTIPATH PROPAGATION | URBAN AREA/AREA BETWEEN BUILDINGS | RADIO WAVE POSITIONING |
| ROAD WITH LARGE IRREGULARITIES ON ROAD SURFACE | ROAD IN BAD STATE | RADIO WAVE POSITIONING |
| ROAD WITH LARGE CHANGES IN ALTITUDE | STEEP SLOPE ROAD | RADIO WAVE POSITIONING |
| ROAD WITH NO HIGH ACCURATE MAP | COMMUNITY ROAD | RADIO WAVE POSITIONING |
| CASE WHERE MANY TERMINALS PRESENT IN VICINITY | — | RADIO WAVE POSITIONING |
| CASE WHERE INSTALLATION DENSITY OF CELLULAR BASE STATIONS IS HIGH | — | RADIO WAVE POSITIONING |
| PLACE WHERE ACCURACY OF RADIO WAVE POSITIONING IS LOW | — | DEAD RECKONING |

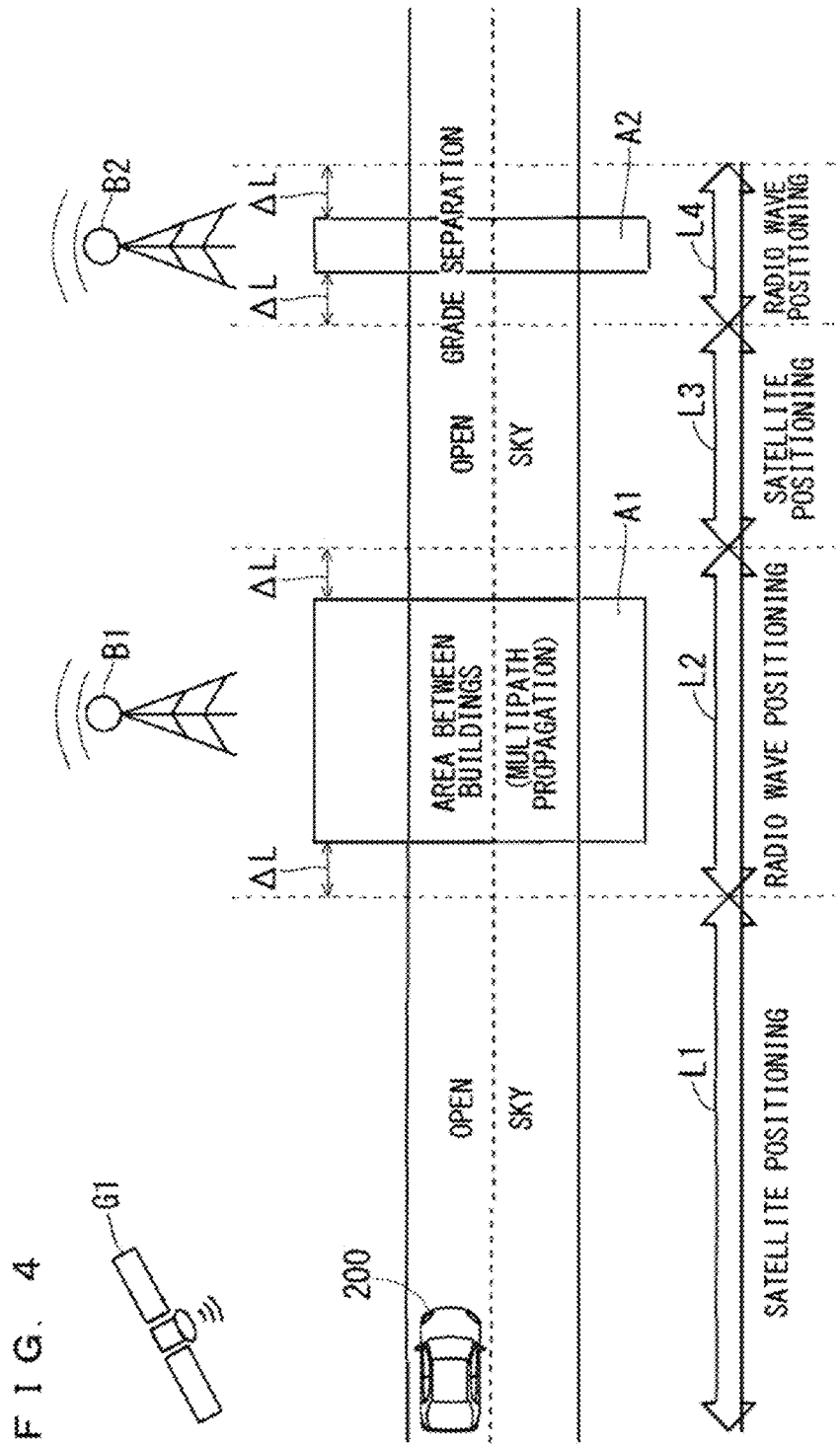

FIG. 8

| SUBJECT VEHICLE POSITION ACCURACY | PERIPHERAL VEHICLE POSITION ACCURACY | SENSING ACCURACY | RADIO WAVE POSITIONING ACCURACY | REFERENCE MOVING BODY | POSITION CORRECTION METHOD |
|---|---|---|---|---|---|
| ○ | ○ | ○ | ○ | SUBJECT VEHICLE, PERIPHERAL VEHICLE | SENSING, RADIO WAVE POSITIONING |
| | | ○ | × | | SENSING |
| | | × | ○ | | RADIO WAVE POSITIONING |
| | | × | × | | PRIORITIZE DEAD RECKONING |
| ○ | × | ○ | ○ | SUBJECT VEHICLE | SENSING, RADIO WAVE POSITIONING |
| | | ○ | × | | SENSING |
| | | × | ○ | | RADIO WAVE POSITIONING |
| | | × | × | | PRIORITIZE DEAD RECKONING |
| × | ○ | ○ | ○ | PERIPHERAL VEHICLE | SENSING, RADIO WAVE POSITIONING |
| | | ○ | × | | SENSING |
| | | × | ○ | | RADIO WAVE POSITIONING |
| | | × | × | | PRIORITIZE DEAD RECKONING |
| × | × | — | — | — | PRIORITIZE DEAD RECKONING |

F I G. 10
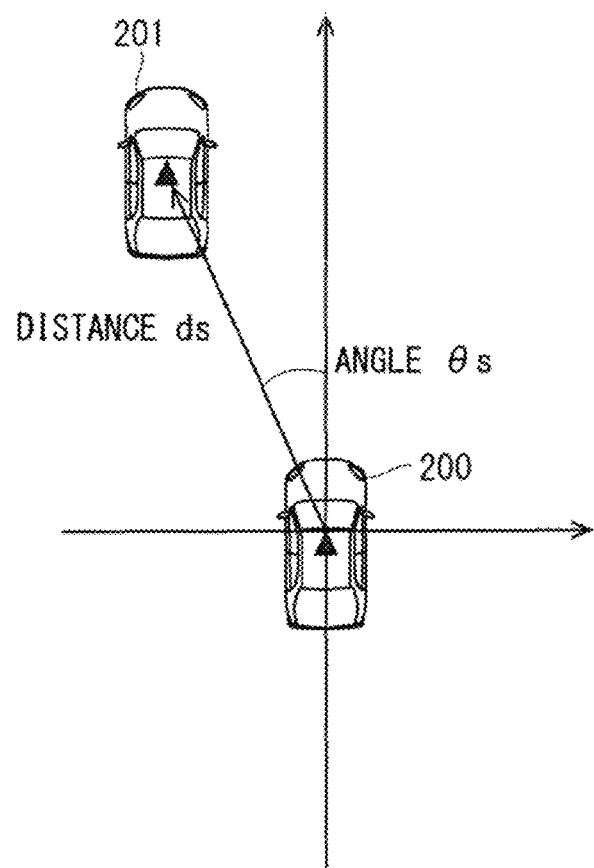

POSITION ESTIMATION DEVICE AND POSITION ESTIMATION METHOD

CROSS-REFERENCE TO RELATED APPLICATION

The present application is based on PCT filing PCT/JP2019/027007, filed Jul. 8, 2019, the entire contents of which are incorporated herein by reference.

TECHNICAL FIELD

The present invention relates to a technique for estimating a position of a moving body.

BACKGROUND ART

Position information of a vehicle indicated by vehicle information is acquired using positioning satellites such as Global Positioning System (GPS), Global Navigation Satellite System (GNSS), and Quasi-Zenith Satellite System (QZSS). However, the position information acquired by using a positioning satellite includes signal errors due to ionosphere delay, multipath propagation due to buildings and the like, and system delay. There are techniques to mitigate the effects of the errors such as dead reckoning or map matching. Dead reckoning is a technique for performing position estimation using an angular velocity obtained from a gyro sensor and a vehicle speed pulse obtained from a vehicle speed sensor. Map matching is a technology for estimating the position by associating the position of a vehicle with a road of map information. However, in either technique, an error depending on the sensor accuracy or the map accuracy occurs.

In response to these problems, in Patent Document 1, a technique is stated in which, when the accuracy of positional measurement deteriorates, the position of a vehicle located in the vicinity is acquired by communication between terminals, and the distance to the vehicle is calculated from the position information, thereby estimating the position based on the calculation result.

Further, in Patent Document 2, a technique is stated which, when performing position correction using a ground target whose position is accurate, separates an area the position correction is performed on and an area the position correction is not performed on in response to the driving environment to perform position correction.

PRIOR ART DOCUMENTS

Patent Documents

[Patent Document 1] Japanese Patent Application Laid-Open No. 2006-275965
[Patent Document 2] Japanese Patent Application Laid-Open No. 2014-66635

SUMMARY

Problem to be Solved by the Invention

According to the technique of Patent Document 1, when the position accuracy of a subject vehicle, which is a vehicle subject to position measurement, is lowered, the position of the subject vehicle is corrected based on position information of a non-subject vehicle having high position accuracy and the distance between the subject vehicle and the non-subject vehicle. However, the position information with reduced accuracy is used to calculate the distance; therefore, estimation of the position with high accuracy is not ensured.

According to the technique of Patent Document 2, determination of whether or not to perform position correction is conducted in accordance with the traveling environment. The position correction is performed based on a reference object installed on a road; therefore, the places where effective execution thereof can be performed are limited.

In view of these problems, an object of the present invention is to continuously estimate the position with high accuracy while the moving body is traveling.

Means to Solve the Problem

A position estimation device of the present invention is installed in a moving body, and includes a position estimation unit configured to estimate a position of a subject moving body being the moving body in which the position estimation device is installed using any of positioning means of satellite positioning using a positioning satellite or radio wave positioning using wireless communication, and a positioning means selection unit configured to switch the positioning means the position estimation unit uses for estimation of the position of the subject moving body based on a traveling environment or a peripheral environment of the subject moving body.

Effects of the Invention

According to the present invention, by switching the positioning means to perform position estimation based on the traveling environment or the peripheral environment of the subject moving body, highly accurate position estimation can be continuously performed while the moving body is traveling. The objects, features, aspects, and advantages of the present invention will become more apparent from the following detailed description and the accompanying drawings.

BRIEF DESCRIPTION OF DRAWINGS

FIG. 3 A diagram illustrating a positioning means switching table.

FIG. 4 A diagram illustrating an example of switching positioning means.

FIG. 8 A diagram illustrating a position correction selection table.

FIG. 10 A diagram illustrating a relative positional relationship between the subject vehicle and the peripheral vehicle.

DESCRIPTION OF EMBODIMENT(S)

A. Embodiment 1

<A-1. Configuration>

Figure 1:
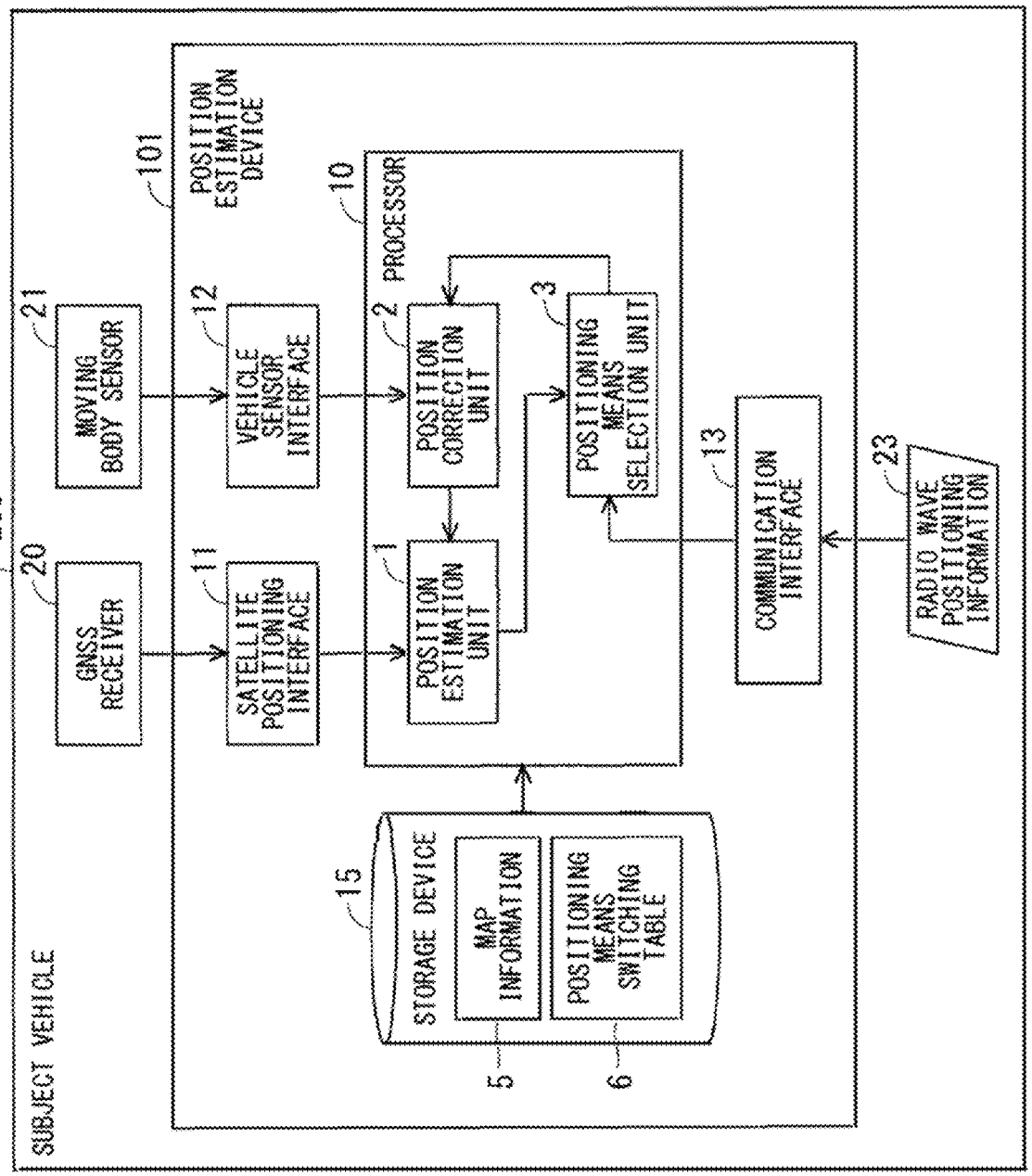
FIG. 1 A block diagram illustrating a configuration of a position estimation device according to Embodiment 1.

FIG. 1 is a block diagram illustrating a configuration of a position estimation device 101 of Embodiment 1. The position estimation device 101 is a device that estimates the position of a moving body. A moving body, a subject of which position the position estimation device 101 estimates, is also referred to as a subject moving body. In FIG. 1, a subject vehicle 200 is illustrated as an example of a subject moving body. The subject vehicle 200 is also referred to as a subject vehicle.

The position estimation device 101 is realized by a computer included in the subject vehicle 200. The position estimation device 101 is connected to a GNSS (Global Navigation Satellite System) receiver 20 and a moving body sensor 21 installed in the subject vehicle 200, and is configured to be able to use them. The position estimation device 101 may be installed in the subject vehicle 200, the GNSS receiver 20 or the moving body sensor 21 in an integrated form or an inseparable form, and may be in a detachable form or a separable form.

The position estimation device 101 includes a processor 10, a storage device 15, a satellite positioning interface 11, a vehicle sensor interface 12, and a communication interface 13.

The satellite positioning interface 11 is a receiver that receives data from the GNSS receiver 20. The standard of the satellite positioning interface 11 adopts Universal Serial Bus (USB) or Recommended Standard 232 (RS-232C).

The vehicle sensor interface 12 is a device for connecting the moving body sensor 21 to the processor 10. The moving body sensor 21 adopts a speed sensor, an acceleration sensor, an azimuth sensor, an electric power steering (EPS), or the like. Specifically, the vehicle sensor interface 12 is a sensor Electronic Control Unit (ECU).

The communication interface 13 includes a receiver and a transmitter. The receiver receives radio wave positioning information 23 from a peripheral moving body and a base station, or detects an arrival angle or the time required for transmission/reception of the radio wave. The transmitter transmits data. Specifically, the communication interface 13 is a communication chip or a Network Interface Card (NIC). The communication interface 13 uses a communication protocol such as Dedicated Short Range Communications (DSRC) or IEEE 802.11p dedicated to vehicle communication. Further, the communication interface 13 may use a mobile phone network such as Long Term Evolution, (LTE, registered trademark) or 5th generation mobile communication system (5G). Further, the communication interface 13 may use a wireless LAN such as IEEE802.11a/b/g/n or Bluetooth (registered trademark).

The radio wave positioning information 23 includes position information positioned by cellular positioning, 5G positioning, or WiFi positioning in which position estimation is performed using LTE, 5G, wireless LAN, or the like. Further, the radio wave positioning information 23 includes position accuracy information in addition to position information. The cellular positioning, 5G positioning, and WiFi positioning may use the Observed Time Difference of Arrival (OTDOA) method, the Enhanced-Cell ID (E-CID) method, and the Uplink-Time Difference of Arrival (UTODA) method that perform position estimation using radio wave reception power, time difference required for transmission/reception, and radio wave arrival angle, however, the methods are not limited thereto.

The processor 10 is connected to other hardware via a signal line and controls the other hardware. The processor 10 is an Integrated Circuit (IC) for executing instructions described in a program to execute processing such as data transfer, calculation, processing, control, or management. The processor 10 has an arithmetic circuit, a register, and a cache memory. Instructions and information are stored in the register and cache memory. Specifically, the processor 10 is a Central Processing Unit (CPU), a Digital Signal Processor (DSP), or a Graphics Processing Unit (GPU).

Figure 2:
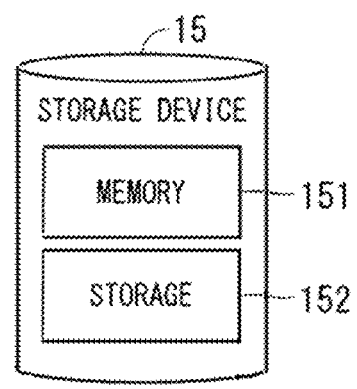
FIG. 2 A diagram illustrating a configuration of a storage device according to Embodiment 1.

The storage device 15 stores map information 5 and a positioning means switching table 6. As illustrated in FIG. 2, the storage device 15 is realized by a memory 151 and a storage 152. Specifically, the memory 151 is a Random Access Memory (RAM). Specifically, the storage 152 is a Hard Disk Drive (HDD). The storage 152 may adopt a portable storage medium such as a Secure Digital (SD, registered trademark) memory card, a Compact Flash Memory (CF), a NAND flash, a flexible disk, an optical disk, a compact disk, a Blu-ray (registered trademark) disk, a DVD.

The position estimation device 101 includes a position estimation unit 1, a position correction unit 2, and a positioning means selection unit 3 as functional components. The functions of the position estimation unit 1, the position correction unit 2, and the positioning means selection unit 3 are realized by software. The storage 152 of the storage device 15 stores a program that realizes the functions of each functional component of the position estimation device 101. This program is read into the memory 151 by the processor 10 and executed by the processor 10. As a result, the functions of the position estimation unit 1, the position correction unit 2, and the positioning means selection unit 3 are realized.

Information, data, signal values, and variable values indicating the processing results of the position estimation unit 1, the position correction unit 2, and the positioning means selection unit 3 are stored in the memory 151 or the register or the cache memory in the processor 10. In the following description, it is assumed that the information, data, signal values, and variable values indicating the processing results of the position estimation unit 1, the position correction unit 2, and the positioning means selection unit 3 are stored in the memory 151.

Although only one processor 10 is illustrated in FIG. 1, the number of processors 10 may be plural, and the plurality of processors 10 may jointly execute programs that realize the functions of the position estimation unit 1, the position correction unit 2, and the positioning means selection unit 3.

<A-2. Operation>

Next, the operation of the position estimation device 101 will be described. The operation of the position estimation device 101 corresponds to a position estimation method of Embodiment 1.

FIG. 3 illustrates the positioning means switching table 6. In the positioning means switching table 6, the environmental conditions when the position estimation device 101 switches the positioning means, the examples of the environments that match the conditions, and the positioning means used by the position estimation device 101 are listed. For example, in a place, such as open skies, where the accuracy of satellite positioning is fine, the position estimation device 101 uses satellite positioning. An open sky indicates a place where no objects to block the sky around. In addition, the accuracy of satellite positioning deteriorates in places where no satellites can be seen, such as undergrounds, tunnels, or grade separations, the position estimation device 101 uses radio wave positioning. Examples of places where the position estimation by satellite positioning or dead reckoning is difficult to perform includes roads with much multipath propagation, roads with large irregularities on the road surface, and roads with large changes in altitude. In traveling environments like these, the position estimation device 101 also uses radio wave positioning. The position estimation device 101 may estimate the traveling environment by pre-reading a map, or may estimate using a traveling speed, the number of observation satellites, a gyro sensor, an acceleration sensor, or the like.

Switching to the radio wave positioning is limited to cases where the position accuracy of radio wave positioning is reliable. When the accuracy of radio wave positioning is low, the position estimation device 101 performs position estimation by dead reckoning instead.

The positioning means switching table 6 illustrated in FIG. 3 is an example. The position estimation device 101 may switch the positioning means in accordance with other environments not illustrated in FIG. 3, or may use other positioning means not illustrated in FIG. 3.

An example of switching the positioning means by the position estimation device 101 will be described with reference to FIG. 4. In FIG. 4, a multipath environment A1 and a grade separation A2 are present in the traveling direction of the subject vehicle 200. The subject vehicle 200 is in a state where satellite positioning by communication with a satellite G1 and radio wave positioning by communication with cellular base stations B1 and B2 are possible. Therefore, the subject vehicle 200 uses the satellite positioning in open sky sections L1 and L3, and uses the radio wave positioning in a section L2 including the multipath environment A1 and a section L4 including the grade separation A2. The section L2 is a section including margin sections ΔL before and after the multipath environment A1. Similarly, the section L4 is a section including margin sections ΔL before and after the grade separation A2 in addition to the grade separation A2. The margin sections ΔL are set in this manner because the position accuracy by the satellite positioning may deteriorate immediately before entering the multipath environment and the grade separation. The length of the margin sections ΔL may differ between the case of the multipath environment A1 and the case of the grade separation A2, and may differ between before and after the multipath environment A1 or between before and after the grade separation A2.

Figure 5:
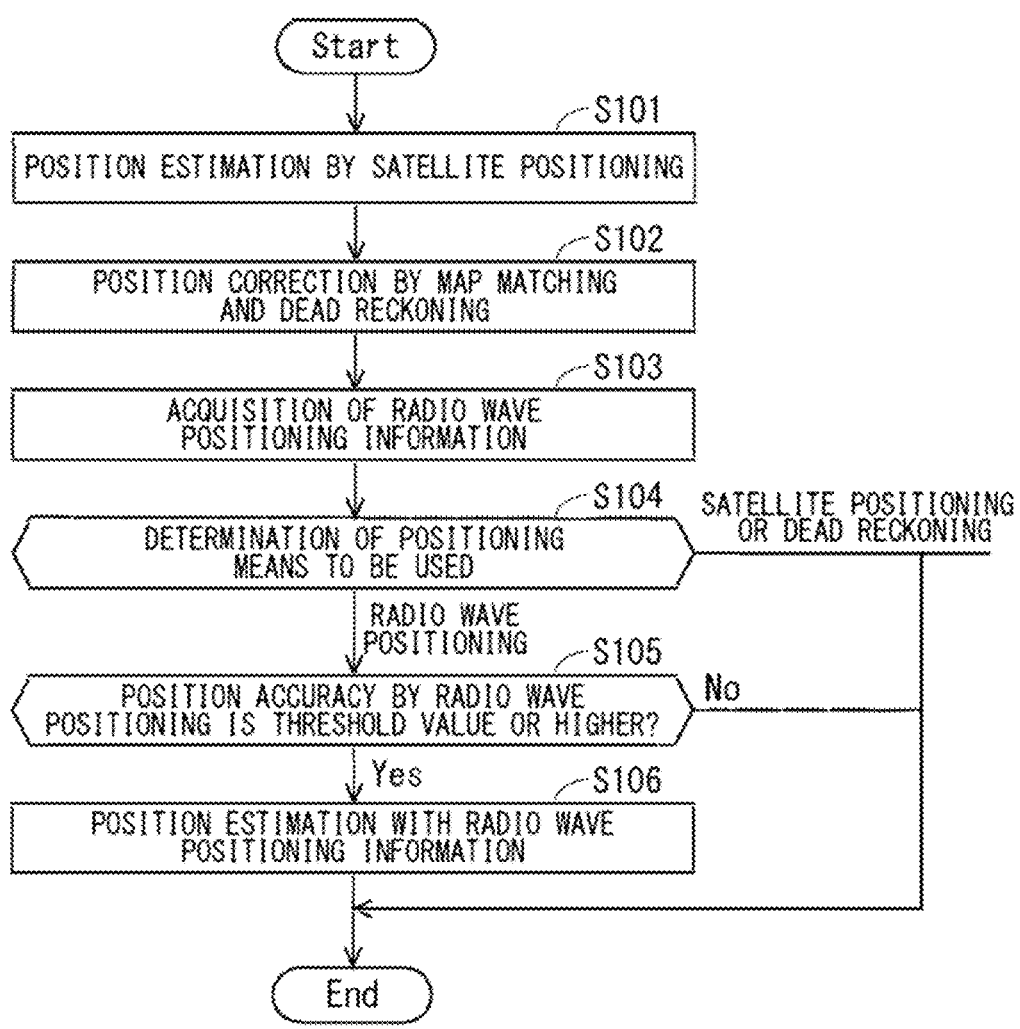
FIG. 5 A flowchart illustrating an operation of the position estimation device according to Embodiment 1.

Next, the overall operation of the position estimation device 101 will be described with reference to the flowchart of FIG. 5.

The operation of the position estimation device 101 is, roughly, a position estimation process by satellite positioning and dead reckoning, a position estimation process by radio wave positioning, a determination process of positioning means switching conditions, and a position correction process. The processes are repeatedly executed while the subject vehicle 200 is moving and halting.

First, the position estimation unit 1 acquires satellite positioning information from the GNSS receiver 20 installed in the subject vehicle 200 via the satellite positioning interface 11, and estimates the position of the subject vehicle 200 from the satellite positioning information (Step S101). The satellite positioning information includes information such as the position, time, speed, traveling direction, number of observation satellites, accuracy of each data, positioning mode, and angle with each satellite of the subject vehicle 200. Each time the position estimation unit 1 receives the satellite positioning information from the satellite positioning interface 11, the position estimation unit 1 stores the satellite positioning information in the memory 151 and notifies the positioning means selection unit 3 of the satellite positioning information. GNSS corresponds to any or all of satellite positioning systems such as GPS (Global Positioning System), GLONASS, Galileo, and Quasi-Zenith Satellite system (QZSS).

Next, the position correction unit 2 performs map matching and dead reckoning to correct the position of the subject vehicle 200 estimated in Step S101 (Step S102). Specifically, the position correction unit 2 acquires the map information 5, and based on the position and azimuth of the subject vehicle 200 estimated by satellite positioning, associates the road estimated to be the closest to the current position of the subject vehicle 200 and the current position, thereby correcting the position of the subject vehicle 200. This is map matching. Further, the position correction unit 2 acquires detection information of the gyro sensor and the acceleration sensor of the subject vehicle 200 via the vehicle sensor interface 12, and calculates the movement amount and the movement angle of the subject vehicle 200. And, the position correction unit 2 corrects the position of the subject vehicle 200 based on the above-mentioned movement amount and movement angle, starting from the position determined by the latest satellite positioning until the satellite positioning information is updated. Map matching and dead reckoning are performed as a complement to position estimation during the period when satellite positioning is not performed, or as position estimation when satellite positioning is disabled.

In this manner, the corrected position information of the subject vehicle 200 is written in the memory 151 by the position correction unit 2 and read out by the position estimation unit 1. Position correction by map matching and dead reckoning is performed based on the latest positioning satellite information, for example, every fixed time interval or every fixed distance traveled. Although the case where the position correction unit 2 performs both map matching and dead reckoning has been described in the above description, only one of them may be performed.

After that, the positioning means selection unit 3 acquires the radio wave positioning information 23 via the communication interface 13 (Step S103).

The communication interface 13 communicates with a mobile base station, a WiFi access point, a beacon, or the like, and estimates the position of the subject vehicle 200 from the time difference required for the communication, the arrival angle of the radio wave, or the reception strength of the radio wave. The position estimation by radio wave positioning is often performed by a mobile base station, an access point, a server, or the like, however, the position estimation device 101 may perform the position estimation as described above. In the following description, it is assumed that the positioning means selection unit 3 acquires the position information estimated by the radio wave positioning as the radio wave positioning information 23. Examples of the radio wave positioning method include, but are not limited to, the Enhanced Cell ID (E-CID) method and the Observed Time Difference Of Arrival (OTDOA) method used in Long Term Evolution (LTE).

Next, the positioning means selection unit 3 determines the positioning means to be used in accordance with the positioning means switching table 6 (Step S104). Specifically, the positioning means selection unit 3 uses the map matching result of Step S102 to pre-read the map of the route on which the subject vehicle 200 will travel, and acquires an underground area, a tunnel, a grade separation, a road gradient, the road altitude, and the like, on the route as a traveling environment. Further, the positioning means selection unit 3 acquires the number of observation satellites from the satellite positioning information, and acquires the number of terminals around the subject vehicle 200 or the installation density of the base stations from the radio wave positioning information 23. These correspond to the peripheral environment. The positioning means selection unit 3 determines the positioning means to be used in accordance with the positioning means switching table 6 based on the traveling environment and the peripheral environment of the subject vehicle 200 thus acquired.

Further, from a position estimation device 102 installed in a peripheral vehicle traveling in front of the subject vehicle 200, the positioning means selection unit 3 may receive position accuracy information of radio wave positioning and satellite positioning of the peripheral vehicle. Then, the positioning means selection unit 3 estimates the future deterioration of the position accuracy of the subject vehicle 200 from the position accuracy information of the peripheral vehicle, and if the deterioration of the position accuracy of the satellite positioning is expected, the positioning means may be switched to radio wave positioning.

When the positioning means selection unit 3 determines that the radio wave positioning is the positioning means to be used in Step S104, the positioning means selection unit 3 determines whether the position accuracy of the radio wave positioning is equal to or higher than a threshold value (Step S105). Specifically, the positioning means selection unit 3 determines the position accuracy of the radio wave positioning from the position information and the position accuracy information acquired from the radio wave positioning information 23. Here, the case where the position accuracy of radio wave positioning is equal to or higher than the threshold value means, for example, the case where the variance $2\sigma$ is 0.5 m or less, and the case where the position accuracy of radio wave positioning is less than the threshold value means, for example, the case where the variance $2\sigma$ is 2.0 m or more. However, the position accuracy may be determined by probability or by positioning means in addition to the variance in the normal distribution.

When the position accuracy of radio wave positioning is equal to or higher than the threshold value in Step S105, the positioning means selection unit 3 adopts the radio wave positioning as the positioning means and notifies the position estimation unit 1 of the radio wave positioning information 23 via the position correction unit 2. Then, the position estimation unit 1 estimates the position of the subject vehicle 200 based on the radio wave positioning information 23 (Step S106). In this manner, the estimated position of the subject vehicle 200 is updated. The position estimation unit 1 registers the position of the subject vehicle 200 estimated in Step S106 in the memory 151, and completes the process.

When the positioning means selection unit 3 determines that satellite positioning or dead reckoning as the positioning means to be used in Step S104, and when the position accuracy of radio wave positioning is less than the threshold value in Step S105, the position estimation by the radio wave positioning information 23 is not performed. In this case, the position correction unit 2 may perform dead reckoning again to correct the position of the subject vehicle 200. The corrected position of the subject vehicle 200 is notified from the position correction unit 2 to the position estimation unit 1, and the position estimation unit 1 registers this in the memory 151 to complete the process.

<A-3. Modification>

In the above description, the position estimation device 101 performs position correction by dead reckoning based on satellite positioning, and performs position estimation by radio wave positioning when the position accuracy of satellite positioning lowers. However, the position estimation device 101 may perform position correction by dead reckoning based on radio wave positioning, and may perform position estimation by satellite positioning when the position accuracy of radio wave positioning lowers.

In this case, in the configuration of the position estimation device 101, in FIG. 1, the satellite positioning interface 11 is connected to the positioning means selection unit 3, and the communication interface 13 is connected to the position estimation unit 1. The operation of the position estimation device 101 is a description in which radio wave positioning and satellite positioning are replaced with each other in section <A-2. Operation>.

Further, the position estimation device 101 may dynamically switch in terms of which is used as a reference between satellite positioning and radio wave positioning based on the accuracy information of both ways of positioning.

FIG. 4 illustrates an example in which the subject vehicle 200 switches the positioning means earlier by the margin section ΔL when the subject vehicle 200 enters a point that matches the switching condition of the positioning means switching table of FIG. 3. However, the position estimation device 101 may prioritize the position estimation by dead reckoning over the radio wave positioning in the margin section ΔL. Further, the position estimation device 101 may switch the positioning means to radio wave positioning when the subject vehicle 200 enters the multipath environment A1 or the grade separation A2 without providing the margin section ΔL.

In addition, the position estimation device 101 learns the past traveling results of the subject vehicle 200, and based on the learning results, automatically updates the positioning means switching table such that the positioning means with the highest accuracy under the same traveling environment or the peripheral environment in the past is available.

The functions of each functional component of the position estimation device 101 are realized by software. However, the functions of each functional component of the position estimation device 101 may be realized by hardware. When the function of each functional component is realized by hardware, the position estimation device 101 includes the satellite positioning interface 11, the vehicle sensor interface 12, the communication interface 13, and an electronic circuit. The electronic circuit is a dedicated electronic circuit that realizes the functions of the functional components and the functions of the storage device of the position estimation device 101.

For the electronic circuit, a single circuit, a composite circuit, a programmed processor, a parallel programmed processor, a logic IC, a Gate Array (GA), an Application Specific Integrated Circuit (ASIC), and a Field-Programmable Gate Array (FPGA) are assumed. A function of each functional component may be realized by one electronic circuit, or a function of each functional component may be distributed and realized in a plurality of electronic circuits.

Further, among the functional components of the position estimation device 101, some functions may be realized by hardware and other functions may be realized by software. The processor 10, the storage device 15, and the electronic circuit are collectively referred to a processing circuit.

<A-4. Effects>

The position estimation device 101 of Embodiment 1 is installed in a moving body, and includes the position estimation unit 1 that estimates the position of the subject moving body being the moving body in which the position estimation device is installed using any of the positioning means of satellite positioning using a positioning satellite or radio wave positioning using wireless communication, and the positioning means selection unit 3 that switches the positioning means the position estimation unit 1 uses for estimation of the position of the subject moving body based on the traveling environment or the peripheral environment of the subject moving body. Accordingly, the position estimation device 101 dynamically switches the positioning means based on the traveling environment and the peripheral environment of the moving body; therefore, in a place where the position accuracy of one positioning means lowers, position estimation with high accuracy is maintained by switching to the other positioning means with higher position accuracy during traveling of the moving body.

B. Embodiment 2

<B-1. Configuration>

Figure 6:
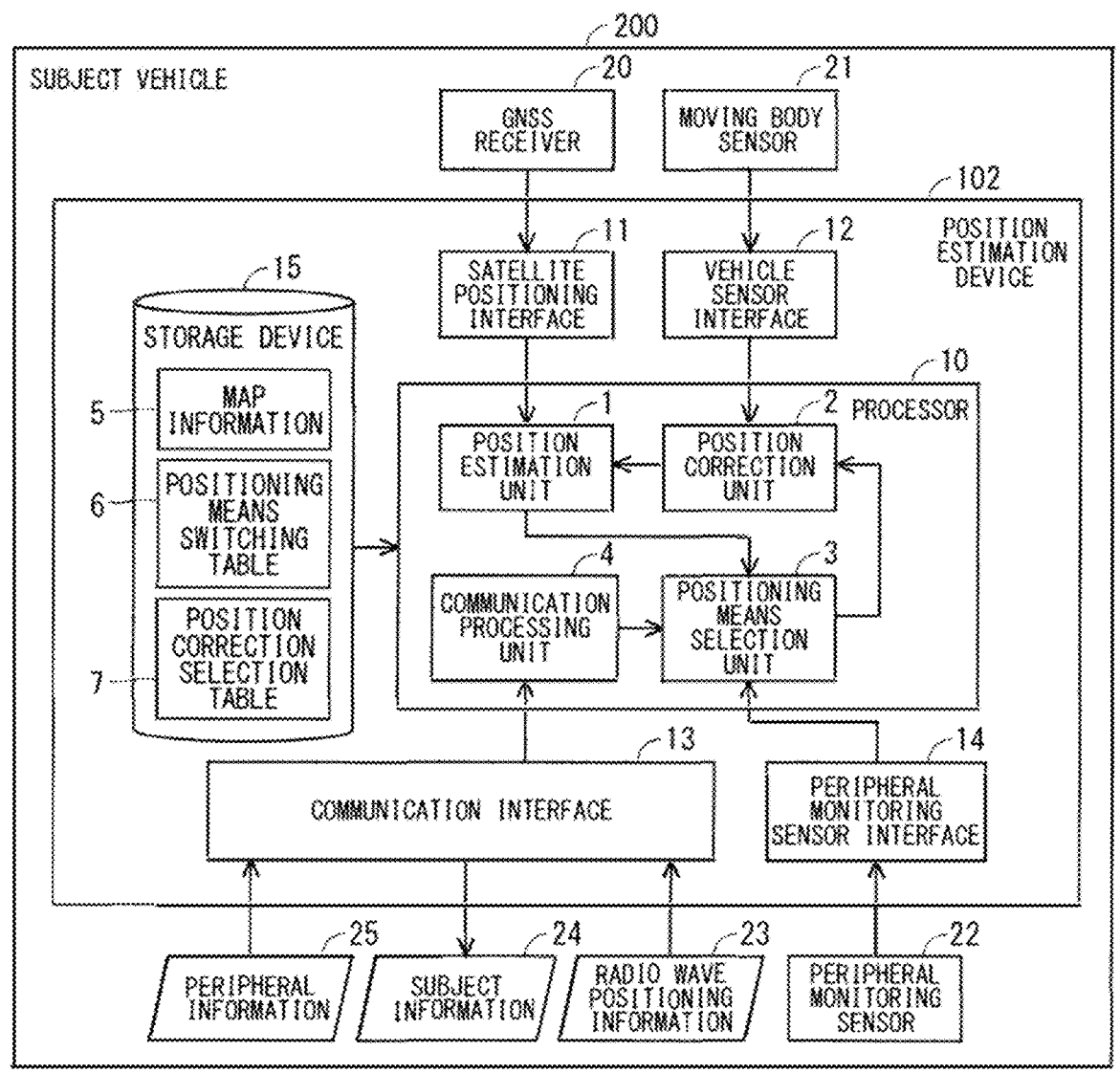
FIG. 6 A block diagram illustrating a configuration of a position estimation device according to Embodiment 2.

FIG. 6 is a block diagram illustrating a configuration of a position estimation device 102 of Embodiment 1. FIG. 6 illustrates the position estimation device 102 installed in the subject vehicle 200. However, the position estimation device 102 is installed not only in the subject vehicle 200 but also on a peripheral vehicle traveling around the subject vehicle 200, and the position information and sensing information are exchanged between the position estimation devices 102 installed in respective vehicles. The position estimation device 102 installed in the subject vehicle 200 corrects the position of the subject vehicle 200 using the position information and the sensing information of the peripheral vehicle received from the position estimation device 102 installed in the peripheral vehicle.

The position estimation device 102 includes a communication processing unit 4, a peripheral monitoring sensor interface 14, and a position correction selection table 7 in addition to the configuration of the position estimation device 101 of Embodiment 1. The communication processing unit 4 is realized by the processor 10 executing a program stored in the memory 151. The position correction selection table 7 is stored in the storage device 15.

The communication processing unit 4 acquires the position information of the subject vehicle 200 estimated by the position estimation unit 1 by satellite positioning and the sensing information of a peripheral monitoring sensor 22 from the positioning means selection unit 3, and transmits the position information and the sensing information to the peripheral vehicle via the communication interface 13. Here, the peripheral vehicle is an example of a peripheral moving body. Further, the communication processing unit 4 receives the position information of the peripheral vehicle by satellite positioning and the sensing information of the peripheral monitoring sensor 22 installed in the peripheral vehicle from the position estimation device 102 installed in the peripheral vehicle. Further, the positioning means selection unit 3 of Embodiment 2 acquires the radio wave positioning information 23 via the communication processing unit 4.

The peripheral monitoring sensor 22 is a sensor installed in the subject vehicle 200, and detects the distance, angle, position, accuracy, type, lane markings on the road, signals, signs, and the like to obstacles such as automobiles, pedestrians, and bicycles. Here, vehicles present around the subject vehicle 200 are also included in the obstacles. The information detected by the peripheral monitoring sensors 22 is collectively referred to as sensing information. Further, the position information of satellite positioning, the position information of radio wave positioning, moving body sensor information, and the sensing information managed by the position estimation device 102 are referred to as subject information 24. Further, the position information, the moving body sensor information, and the sensing information received from the peripheral vehicle are referred to as peripheral information 25.

The peripheral monitoring sensor interface 14 is a device including a receiver that receives the sensing information of the peripheral monitoring sensor 22. The peripheral monitoring sensor interface 14 is specifically a sensor ECU, a Controller Area Network (CAN), or RS-232C. The positioning means selection unit 3 acquires the sensing information of the peripheral monitoring sensor 22 via the peripheral monitoring sensor interface 14 and notifies the communication processing unit 4 and the position correction unit 2.

<B-2. Operation>

Figure 7:
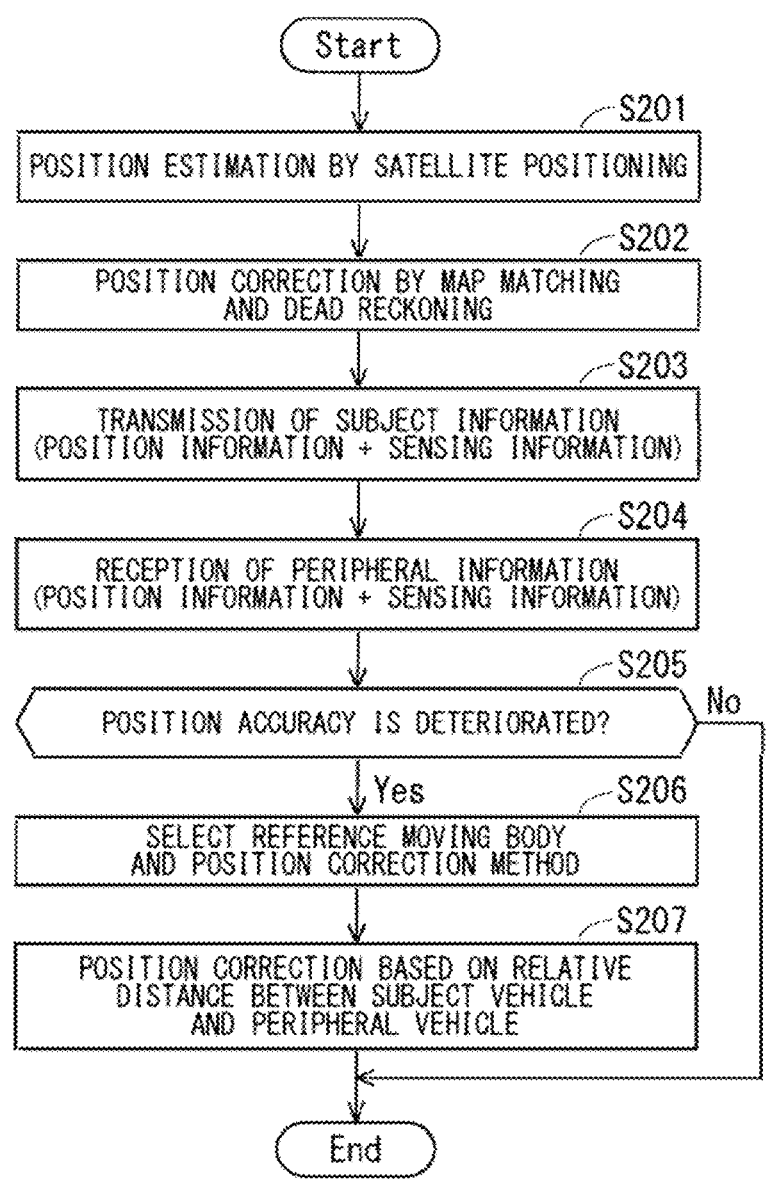
FIG. 7 A flowchart illustrating an operation of the position estimation device according to Embodiment 2.

Next, the overall operation of the position estimation device 102 will be described with reference to the flowchart of FIG. 7. Step S201 and Step S202 in FIG. 7 are similar to Step S101 and Step S102 in FIG. 5. In Step S203, the communication processing unit 4 acquires the position information of the subject vehicle 200 and the sensing information of the peripheral monitoring sensor 22 (hereinafter, simply referred to as "sensing information") from the positioning means selection unit 3, and transmits the information to the peripheral vehicle and a base station via the communication interface 13. The position information of the subject vehicle 200 to be transmitted here is either satellite-positioned position information or position information corrected by at least either map matching or dead reckoning based on satellite positioning.

Next, the positioning means selection unit 3 receives the position information and the sensing information of the peripheral vehicle from the position estimation device 102 installed in the peripheral vehicle via the communication processing unit 4. The position information of the peripheral vehicle to be received here is either satellite-positioned position information or position information corrected by at least either map matching or dead reckoning based on satellite positioning. Further, the positioning means selection unit 3 receives the radio wave positioning information via the communication processing unit 4 (Step S204).

Next, the positioning means selection unit 3 grasps the position accuracy of radio wave positioning from the position accuracy information included in the radio wave positioning information 23, and grasps the position accuracy of satellite positioning based on the positioning means switching table 6. Then, the positioning means selection unit 3 determines whether or not the position accuracy of at least any of radio wave positioning and satellite positioning is deteriorated at present or is going to be deteriorated in the future (Step S205). Deterioration of the position accuracy of satellite positioning is typically estimated by estimating the traveling environment using pre-reading a map, the traveling speed, the number of observation satellites, the gyro sensor, the acceleration sensor, or the like.

When determined in Step S205 that there is no deterioration in position accuracy at present or in the future, the position correction based on the relative position with the peripheral vehicle is not performed, and the position estimation device 102 ends the process.

On the other hand, when determined in Step S205 that there is deterioration in position accuracy at present or in the future, the positioning means selection unit 3 selects a reference moving body and a position correction method from the position correction selection table 7 based on the subject information 24, the peripheral information 25, and the radio wave positioning information 23 (Step S206).

Next, the position correction unit 2 corrects the position of the subject vehicle 200 based on the relative position between the subject vehicle 200 and the peripheral vehicle (Step S207). The detailed procedure of the position correction will be described later in FIG. 12. The position correction unit 2 notifies the position estimation unit 1 of the corrected position information, and completes the process.

The position correction selection table 7 will be described with reference to FIG. 8. In the position correction selection table 7, whether the reference moving body belongs to the subject vehicle or the peripheral vehicle in accordance with the position accuracy of the subject vehicle 200 and the peripheral vehicle by satellite positioning. The reference moving body is a moving body that serves as a reference when performing position correction. Further, in the position correction selection table 7, the position correction method is determined in accordance with the sensing accuracy and the radio wave positioning accuracy of the peripheral monitoring sensor 22.

For example, when the position accuracy of the subject vehicle 200 is low and the position accuracy of the peripheral vehicle is high, the positioning means selection unit 3 selects the peripheral vehicle as the reference moving body in accordance with the position correction selection table 7. When the sensing accuracy and the radio wave positioning accuracy are high, the positioning means selection unit 3 selects both sensing and radio wave positioning as the position correction method in accordance with the position correction selection table 7. On the other hand, when the sensing accuracy and the radio wave positioning accuracy are low, the positioning means selection unit 3 selects dead reckoning as the position correction method in accordance with the position correction selection table 7.

The position correction selection table 7 illustrated in FIG. 8 is an example. The positioning means selection unit 3 may select a reference moving body or a position correction method in accordance with a traveling place or other conditions. Further, the positioning means selection unit 3 may select another positioning means not listed in the position correction selection table 7 of FIG. 8 as the position correction method.

Figure 9:
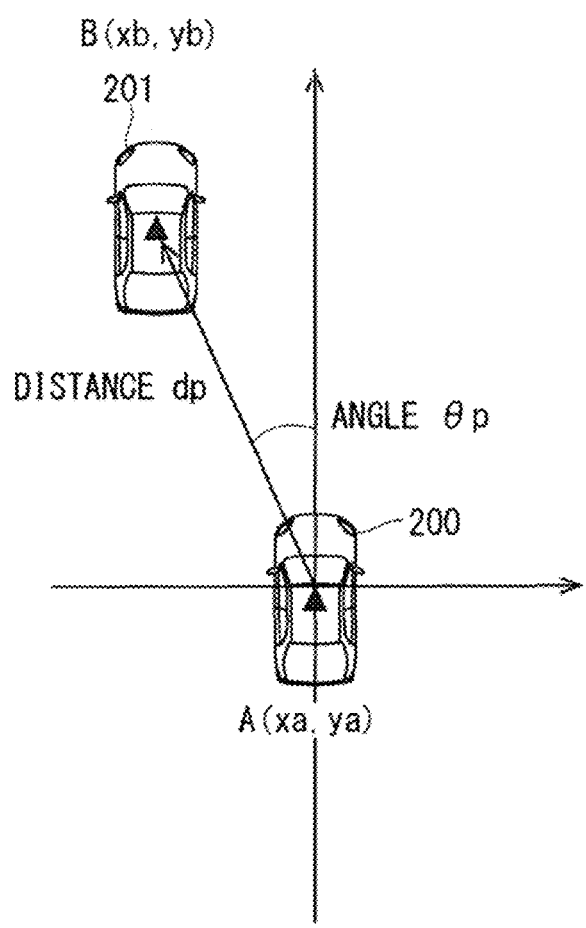
FIG. 9 A diagram illustrating a relative positional relationship between a subject vehicle and a peripheral vehicle.

Next, the relative positional relationship between a subject vehicle 200 and the peripheral vehicle 201 will be described with reference to FIGS. 9 to 11. FIG. 9 illustrates the relative positional relationship between the subject vehicle 200 and the peripheral vehicle 201 grasped by the position information by satellite positioning. By satellite positioning, the latitude xa and longitude ya of the subject vehicle 200 can be obtained, and the latitude xb and longitude yb of the peripheral vehicle 201 can be obtained. From the information, the relative distance dp and the relative angle θp between the subject vehicle 200 and the peripheral vehicle 201 are calculated.

FIG. 10 illustrates the relative positional relationship between the subject vehicle 200 and the peripheral vehicle 201 grasped by the sensing information. The peripheral monitoring sensor 22 installed in the subject vehicle 200 detects the relative distance ds and the relative angle θs with the peripheral vehicle 201.

Figure 11:
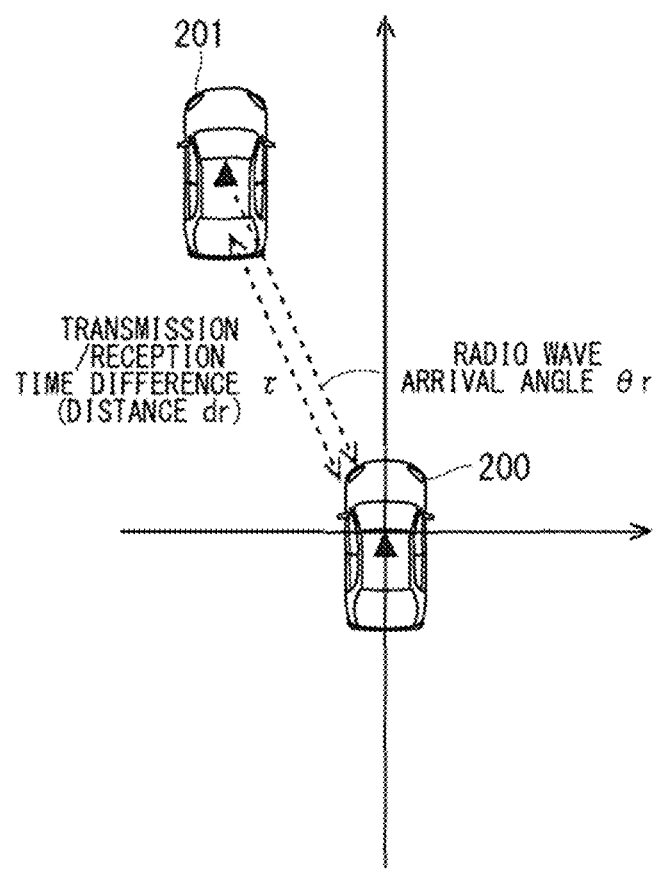
FIG. 11 A diagram illustrating a relative positional relationship between the subject vehicle and the peripheral vehicle.

FIG. 11 illustrates the relative positional relationship between the subject vehicle 200 and the peripheral vehicle 201 grasped by the radio wave positioning information 23. The relative distance dr of both vehicles is calculated from the transmission/reception time difference τ that occurs in the communication between the subject vehicle 200 and the peripheral vehicle 201. Further, a radio wave arrival angle from the peripheral vehicle 201 is the relative angle θr of both vehicles.

Next, a position correction process in Step S207 of FIG. 7 will be described with reference to FIG. 12. First, the positioning means selection unit 3 sets a position by positioning with high position accuracy between satellite positioning and radio wave positioning as the position A of the subject vehicle 200 (Step S301). The process corresponds to the process of Steps S104 to S106 of FIG. 5 described in Embodiment 1.

Then, the positioning means selection unit 3 receives the peripheral information 25 from a plurality of peripheral vehicles 201, and extracts the peripheral vehicle 201 with high position accuracy by referring to the peripheral information 25 (Step S302).

Next, the positioning means selection unit 3 selects a reference moving body and a position correction method based on the position correction selection table 7 from the satellite positioning accuracy, sensing accuracy, and radio wave positioning accuracy of the subject vehicle 200 and the peripheral vehicle 201 (Step S303). In the following description, it is assumed that sensing is selected as the position correction method in the step.

Then, the position correction unit 2 calculates the relative distance dp and the relative angle θp of both vehicles from the satellite positioning information of the subject vehicle 200 and the peripheral vehicle 201 (Step S304).

Next, the position correction unit 2 calculates the relative distance and the relative angle between the subject vehicle 200 and the peripheral vehicle 201 based on the reference moving body and the position correction method selected in Step S303, and estimates the position of the subject vehicle 200 (Step S305). Specifically, when the reference moving body is the peripheral vehicle 201, the position correction unit 2 uses the sensing information or the radio wave positioning information in the peripheral vehicle 201 to calculate the relative distance and the relative angle between the peripheral vehicle 201 and the subject vehicle 200, and estimates the position satisfying the above relative distance and relative angle from the position by satellite positioning of the peripheral vehicle 201 as the position of the subject vehicle 200. In this step, A' represents the position of the subject vehicle 200 estimated using the sensing information, and A" represents the position of the subject vehicle 200 estimated using the radio wave positioning information. In the following description, it is assumed that the position A' is estimated in the following description.

Further, when the position accuracy of the subject vehicle 200 is high and the position accuracy of the peripheral vehicle 201 is low, the positioning means selection unit 3 selects the subject vehicle 200 as the reference moving body, and the position correction unit 2 uses the sensing information or the radio wave positioning information to calculate the relative distance and the relative angle between the peripheral vehicle 201 and the subject vehicle 200, and estimates the position where the above relative distance and relative angle are satisfied from the position by satellite positioning position of the subject vehicle 200 as the position of the peripheral vehicle 201. Although an example is described in which the sensing accuracy and the radio wave positioning accuracy are high, the position correction unit 2 performs position correction using accurate information when one of the accuracies is low.

Then, the position correction unit 2 checks whether the position A and the position A' are separated from each other (Step S306). In this step, the position correction unit 2 determines, for example, whether the position A and the position A' are separated by a certain distance or more. However, the step is not limited thereto, and the position correction unit 2 may make a probabilistic determination by using the determination results produced by a plurality of times.

When the position A and the position A' do not separate from each other in Step S306, the position correction unit 2 does not perform the position correction with the position A', and performs the position correction by dead reckoning to complete the process (Step S307).

On the other hand, when the current position A and the position A' separate from each other in Step S306, the position correction unit 2 corrects the current position A with the position A' (Step S308).

Figure 13:
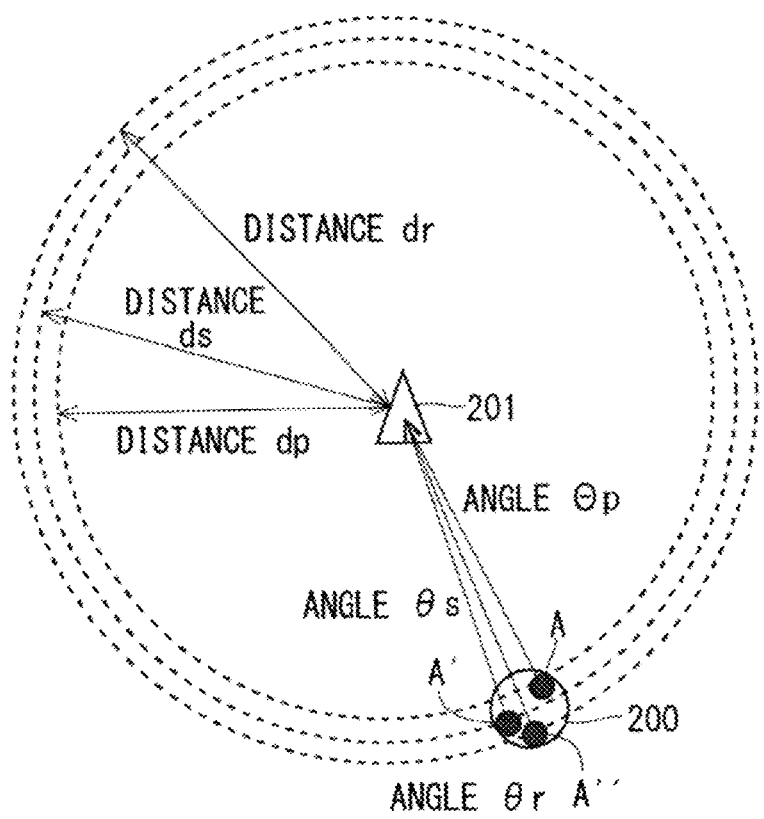
FIG. 13 A diagram illustrating a position correction process in Step S308 of FIG. 12.

FIG. 13 illustrates an example of the correction process in Step S308 when the peripheral vehicle 201 is used as the reference moving body and the sensing and radio wave positioning are used as the position correction method. The position correction unit 2 calculates the position A of the subject vehicle 200 from the relative distance dp and the relative angle θp between the subject vehicle 200 and the peripheral vehicle 201. The positioning means selection unit 3 calculates the position A' of the subject vehicle 200 from the relative distance ds and the relative angle θs between the subject vehicle 200 and the peripheral vehicle 201. Also, the positioning means selection unit 3 calculates the position A" of the subject vehicle 200 from the relative distance dr and the relative angle θr between the subject vehicle 200 and the peripheral vehicle 201.

The position correction unit 2 sets the center of gravity of A, A', and A" as the position of the subject vehicle 200. It should be noted that, this position correction method is an example. For example, the positioning means selection unit 3 may weight A, A', A" from the position accuracy or the past probability, or may correct the position by a Kalman filter or a particle filter. The position correction unit 2 notifies the position estimation unit 1 of the current position of the subject vehicle 200 corrected in this manner.

<B-3. Modification>

Figure 14:
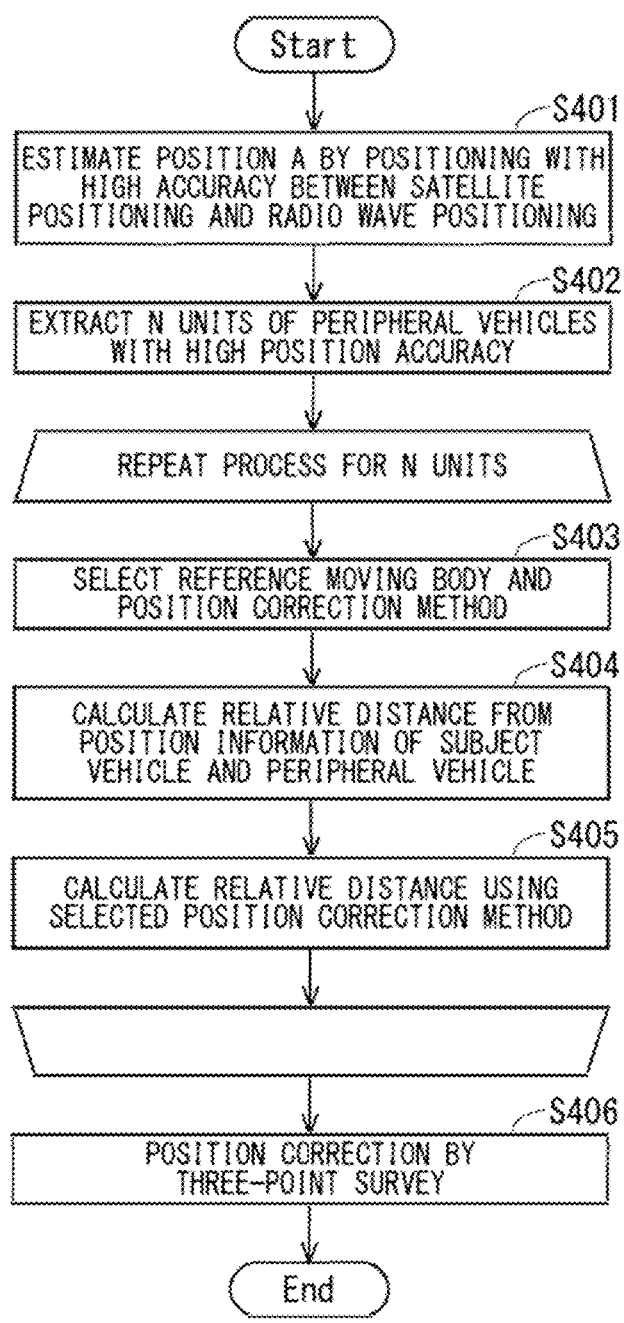
FIG. 14 A flowchart illustrating a position correction process of a position estimation device of Modification according to Embodiment 2.

In the above example, the position estimation device 102 corrects the position of the subject vehicle 200 using the relative position with one peripheral vehicle 201. However, in the above example, there may be a plurality of peripheral vehicles 201. That is, the position estimation device 102 may correct the position of the subject vehicle 200 using the relative position with a plurality of peripheral vehicles 201. The position correction process of the position estimation device 102 in that case will be described with reference to the flowchart of FIG. 14.

First, the positioning means selection unit 3 sets the position of the subject vehicle 200 by positioning with high position accuracy between satellite positioning and radio wave positioning (Step S401). This step is the same as Step S301 of FIG. 12. Next, the positioning means selection unit 3 receives the peripheral information 25 from a plurality of peripheral vehicles 201, and extracts N units of peripheral vehicles 201 with high position accuracy by referring to the peripheral information 25 (Step S402). Here, N is an integer of 3 or more. Then, the positioning means selection unit 3 performs the processes of Steps S403 to S405 for the N peripheral vehicles 201 extracted in Step S402.

Figure 12:
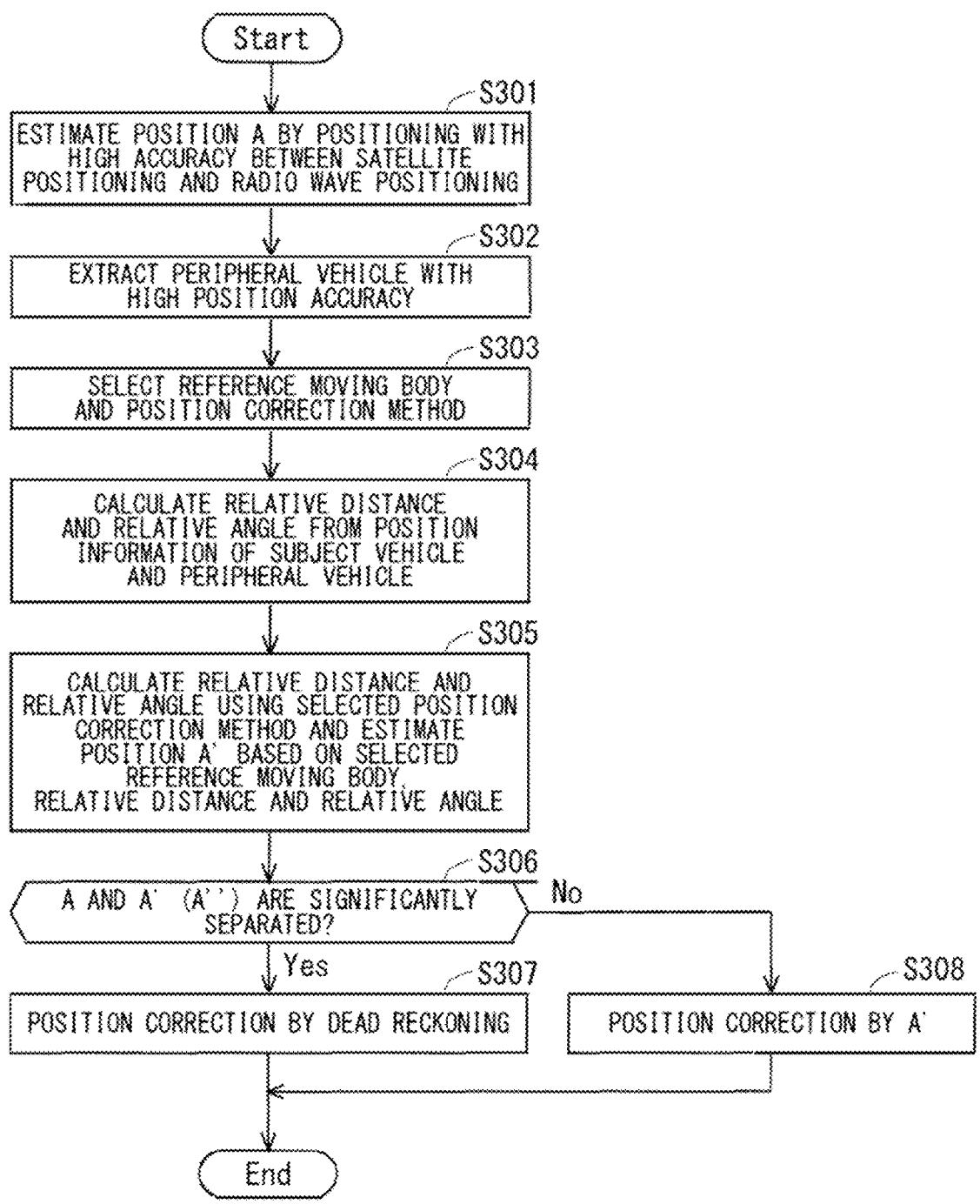
FIG. 12 A flowchart illustrating a position correction process in Step S206 of FIG. 7.

Step S403 is similar to Step S303 in FIG. 12. After Step S403, from the satellite positioning information of the subject vehicle 200 and the peripheral vehicle 201, the position correction unit 2 calculates the relative distance of both vehicles (Step S404). After Step S404, the position correction unit 2 calculates the relative distance between the target vehicle 200 and the peripheral vehicle 201 using the position correction method selected in Step S403 (Step S405).

When the processes from Step S403 to Step S405 are completed for the N peripheral vehicles 201, the position correction unit 2 performs position correction by the three-point survey (Step S406). That is, the position correction unit 2 estimates the position of the subject vehicle 200 having the relative distance Dn between the subject vehicle 200 and the plurality of peripheral vehicles 201 using the relative distance Dn between the subject vehicle 200 and the plurality of peripheral vehicles 201. The relative distance Dn differs for each peripheral vehicle 201. Specifically, the position correction unit 2 draws a circle having a radius of Dn centered on the position of the peripheral vehicle 201, and among the intersections of the circles, the intersection that does not separate from the current position A is set as the position of the subject vehicle 200.

Although in the above example, the position of the target vehicle 200 is estimated using only the relative distance Dn, the position of the subject vehicle 200 may be limited within a specific range and may be calculated by taking the relative angle into consideration in addition to the relative distance Dn. In this case, in Step S304 and Step S305, the position correction unit 2 calculates the relative angle in addition to the relative distance Dn.

<B-4. Effects>

The position estimation device 102 of Embodiment 2 includes the communication processing unit 4 that receives the satellite positioning information of the peripheral moving body and the sensing information by the peripheral monitoring sensor 22 installed in the peripheral moving body from the peripheral moving body traveling around the subject moving body. The position correction unit 2 selects at least one of the sensing information and radio wave positioning by wireless communication between the subject moving body and the peripheral moving body as the position correction method, calculates the relative distance between the subject moving body and the peripheral moving body based on the selected position correction method, and corrects the position of the subject moving body estimated by the position estimation unit 1 based on the satellite positioning information of the peripheral moving body and the relative distance. As described above, according to the position estimation device 102, the position of the subject moving body can be estimated with high accuracy by correcting the position of the subject moving body with the relative distance with the peripheral moving body.

Further, when the position estimation device 102 corrects the position of the subject moving body with the relative distance with three or more peripheral moving bodies, this improves the position accuracy.

In the present invention, Embodiments can be combined, appropriately modified or omitted, without departing from the scope of the invention. While the invention has been described in detail, the foregoing description is in all aspects illustrative and not restrictive. It is understood that numerous other modifications not having been described can be devised without departing from the scope of the invention.

EXPLANATION OF REFERENCE SIGNS

1 position estimation unit, 2 position correction unit, 3 positioning means selection unit, 4 communication processing unit, 5 map information, 6 positioning means switching table, 7 position correction selection table, 10 processor, 11 satellite positioning interface, 12 vehicle sensor interface, 13 satellite positioning interface, 14 vehicle sensor interface, 15 storage device, 20 GNSS receiver, 21 moving body sensor, 22 peripheral monitoring sensor, 23 radio wave positioning information, 24 subject information, 25 peripheral information, 101, 102 position estimation device, 151 memory, 152 storage, 200 subject vehicle, 201 peripheral vehicle.

The invention claimed is:

1. A position estimation device installed in each of a plurality of moving bodies, comprising:
a processor to execute a program; and
a memory to store the program which, when executed by the processor, performs processes of,
estimating a position of a subject moving body being the moving body in which the position estimation device is installed as an estimated position using any of positioning means of satellite positioning using a positioning satellite or radio wave positioning using wireless communication with a cellular base station,
switching the positioning means for estimation of the position of the subject moving body based on a traveling environment or a peripheral environment of the subject moving body,
correcting the estimated position of the subject moving body in accordance with an estimation accuracy,
performing transmission/reception of the estimated position of the subject moving body and sensing information by a peripheral monitoring sensor installed in the subject moving body between the position estimation device installed in a peripheral moving body being the moving body traveling around the subject moving body,
when an estimation accuracy of the estimated position of the peripheral moving body is higher than the estimation accuracy of the estimated position of the subject moving body, selecting, as a position correction method, from at least any of the sensing information of the peripheral moving body or radio wave positioning of the subject moving body by wireless communication with the peripheral moving body based on the position accuracy of the sensing information of the peripheral moving body and the position accuracy of the radio wave positioning of the subject moving body by wireless communication with the peripheral moving body, calculating a relative distance and a relative angle between the subject moving body and the peripheral moving body based on the selected position correction method, and correcting the estimated position of the subject moving body based on the estimated position of the peripheral moving body, the relative distance, and the relative angle, and
when the estimation accuracy of the estimated position of the subject moving body is higher than an estimation accuracy of the estimated position of the peripheral moving body, selecting, as a position correction method, from at least any of the sensing information of the subject moving body or radio wave positioning of the subject moving body by wireless communication with the peripheral moving body based on a position accuracy of the sensing information of the subject moving body and a position accuracy of the radio wave positioning of the subject moving body by wireless communication with the peripheral moving body, calculating a relative distance and a relative angle between the subject moving body and the peripheral moving body based on the selected position correction method, and correcting the estimated position of the peripheral moving body based on the estimated position of the subject moving body, the relative distance, and the relative angle.

2. The position estimation device according to claim 1, wherein
when the estimation accuracy of the estimated position of the peripheral moving body is higher than the estimation accuracy of the estimated position of the subject moving body, and both the sensing information of the peripheral moving body and the radio wave positioning of the subject moving body by wireless communication with the peripheral moving body are selected as the position correction method,
based on the estimated position of the peripheral moving body,
a position of the subject moving body is estimated as a first subject position from the relative distance and the relative angle calculated from the estimated positions of the subject moving body and the peripheral moving body,
a position of the subject moving body is estimated as a second subject position from the relative distance and the relative angle calculated from the sensing information of the peripheral moving body,
a position of the subject moving body is estimated as a third subject position from the relative distance and the relative angle calculated from the radio wave positioning of the subject moving body by radio wave communication with the peripheral moving body, and
the estimated position of the subject moving body is corrected based on the first subject position, the second subject position, and the third subject position, and
when the estimation accuracy of the estimated position of the subject moving body is higher than the estimation accuracy of the estimated position of the peripheral moving body, and both the sensing information of the subject moving body and the radio wave positioning of the subject moving body by wireless communication with the peripheral moving body are selected as the position correction method,
based on the estimated position of the subject moving body,
a position of the peripheral moving body is estimated as a first peripheral position from the relative distance and the relative angle calculated from the estimated positions of the subject moving body and the peripheral moving body,
a position of the peripheral moving body is estimated as a second peripheral position from the relative distance and the relative angle calculated from the sensing information of the subject moving body,
a position of the peripheral moving body is estimated as a third peripheral position from the relative distance and the relative angle calculated from the radio wave positioning of the subject moving body by radio wave communication with the peripheral moving body, and the position of the peripheral moving body is corrected based on the first peripheral position, the second peripheral position, and the third peripheral position.

3. The position estimation device according to claim 1, wherein the traveling environment or the peripheral environment of a path through which the subject moving body is to travel in the future is acquired, based on the position of the subject moving body by the satellite positioning or the radio wave positioning and map information, and the positioning means is switched based on the traveling environment or the peripheral environment of the path through which the subject moving body is to travel in the future.

4. The position estimation device according to claim 1, wherein switching of the positioning means is performed in accordance with a positioning means switching table in which a correspondence relation between the traveling environment or the peripheral environment and the positioning means is determined.

5. The position estimation device according to claim 4, wherein switching to the positioning means corresponding to the traveling environment or the peripheral environment is performed at a timing at which the subject moving body travels at a position in front by a predetermined distance of the traveling environment or the peripheral environment determined in the positioning means switching table.

6. The position estimation device according to claim 1, wherein the number of the peripheral moving bodies is three or more.

7. The position estimation device according to claim 1, wherein the positioning means is switched based on a position accuracy of, among the peripheral moving bodies traveling around the subject moving body, the peripheral moving body traveling in front of the subject moving body.

8. A position estimation method executed by a position estimation device installed in each of a plurality of moving bodies, the position estimation device executing the method comprising the steps of:

estimating a position of a subject moving body as an estimated position using any of positioning means of satellite positioning using a positioning satellite or radio wave positioning using wireless communication with a cellular base station, switching the positioning means for estimation of the position of the subject moving body based on a traveling environment or a peripheral environment of the subject moving body, correcting the estimated position of the subject moving body in accordance with an estimation accuracy, performing transmission/reception of the estimated position of the subject moving body and sensing information by a peripheral monitoring sensor installed in the subject moving body between the position estimation device installed in a peripheral moving body being the moving body traveling around the subject moving body, when an estimation accuracy of the estimated position of the peripheral moving body is higher than the estimation accuracy of the estimated position of the subject moving body, selecting, as a position correction method, from at least any of the sensing information of the peripheral moving body or radio wave positioning of the subject moving body by wireless communication with the peripheral moving body based on the position accuracy of the sensing information of the peripheral moving body and the position accuracy of the radio wave positioning of the subject moving body by wireless communication with the peripheral moving body, calculating a relative distance and a relative angle between the subject moving body and the peripheral moving body based on the selected position correction method, and correcting the estimated position of the subject moving body based on the estimated position of the peripheral moving body, the relative distance, and the relative angle, and when the estimation accuracy of the estimated position of the subject moving body is higher than an estimation accuracy of the estimated position of the peripheral moving body, selecting, as a position correction method, from at least any of the sensing information of the subject moving body or radio wave positioning of the subject moving body by wireless communication with the peripheral moving body based on a position accuracy of the sensing information of the subject moving body and a position accuracy of the radio wave positioning of the subject moving body by wireless communication with the peripheral moving body, calculating a relative distance and a relative angle between the subject moving body and the peripheral moving body based on the selected position correction method, and correcting the estimated position of the peripheral moving body based on the estimated position of the subject moving body, the relative distance, and the relative angle.

* * * * *